(12) United States Patent
Hariharan

(10) Patent No.: US 8,477,654 B2
(45) Date of Patent: Jul. 2, 2013

(54) METHOD FOR REPRESENTING NODES IN NETWORK

(75) Inventor: Trichur Easwaran Hariharan, Chennai (IN)

(73) Assignee: Infosys Limited (IN)

( * ) Notice: Subject to any disclaimer, the term of this patent is extended or adjusted under 35 U.S.C. 154(b) by 552 days.

(21) Appl. No.: 12/652,199

(22) Filed: Jan. 5, 2010

(65) Prior Publication Data

US 2010/0172269 A1    Jul. 8, 2010

(30) Foreign Application Priority Data

Jan. 7, 2009  (IN) .............................. 45/CHE/2009

(51) Int. Cl.
*H04L 12/28* (2006.01)
(52) U.S. Cl.
USPC .......................... 370/254; 370/389; 707/802
(58) Field of Classification Search
USPC .................................. 370/254, 389; 707/802
See application file for complete search history.

(56) References Cited

U.S. PATENT DOCUMENTS

| | | | |
|---|---|---|---|
| 5,794,006 A * | 8/1998 | Sanderman | 709/223 |
| 8,069,188 B2 * | 11/2011 | Larson et al. | 707/802 |
| 2008/0107104 A1 * | 5/2008 | Olderdissen et al. | 370/389 |
| 2009/0100151 A1 * | 4/2009 | Fisher et al. | 709/219 |

\* cited by examiner

*Primary Examiner* — Wei Zhao
(74) *Attorney, Agent, or Firm* — Lerner, David, Littenberg, Krumholz & Mentlik, LLP

(57) ABSTRACT

A method and computer program product for creating a data structure for representing a plurality of nodes in a network. One or more data fields are created corresponding to the plurality of nodes for storing information related to the nodes. One or more references are also created for each node such that each reference refers to a node adjacent to the corresponding node. The data fields and the references are then stored in a plurality of secondary data structures. Thereafter, each node is associated with a secondary data structure which includes the data fields and the references corresponding to the associated node. Subsequently, the data structure may be created for storing the secondary data structures.

16 Claims, 7 Drawing Sheets

METHOD FOR REPRESENTING NODES IN NETWORK

BACKGROUND OF THE INVENTION

The present invention relates generally to a method for representing a plurality of nodes in a network. In particular, the present invention relates to a method for creating a data structure for representing the nodes in the network.

Presently, data structures such as adjacency lists and edge lists are used to represent networks. However, in such data structures, adjacency information is stored separately for each node. In other words, information relating to adjacent nodes in the network is stored individually for each node. This often results in redundancy of information. Further, updating the data structures may involve a significant processing overhead since adjacency information may need to be updated for more than one node. Also, there is a potential risk of data inconsistency if data is not updated properly. In addition, the data structures need to be traversed sequentially to determine whether one node is adjacent or connected to another node in the network, resulting in an increase in processing time. Furthermore, these data structures do not conform to a real world representation of the network; therefore visualization of the network through such data structures is difficult.

In light of the discussion above, there is a need to reduce redundancy of data while representing networks through a data structure. Further, there is a need to minimize processing overhead while updating the data structure. Also, the data structure must not necessitate sequential traversal for determining connections between the nodes in the networks.

BRIEF SUMMARY OF THE INVENTION

To overcome the limitations described above, the invention describes a method for creating a primary data structure for representing a plurality of nodes in a network. One or more data fields are created corresponding to each of the plurality of nodes for storing information relating to the node. One or more references are also created for each node such that each reference refers to one or more nodes adjacent to the corresponding node. The data fields and the references may then be stored in a plurality of secondary data structures. Thereafter, each node may be associated with at least one secondary data structure which includes the data fields and the references corresponding to the associated node. Thus, the secondary data structure associated with each node stores data relating to the node and information relating to adjacent nodes in the network. Subsequently, a primary data structure, for example, an array may be created for storing the secondary data structures.

Since data relating to the nodes is stored along with the information relating to adjacent nodes in the network, processing overhead while accessing the network is reduced. Further, since information relating to adjacent nodes is not stored individually for each node, redundancy of data is reduced. In addition, the primary data structure need not be traversed sequentially for accessing the network. Moreover, visualization of the network becomes easier, since representation of the secondary data structures conforms to a real world representation of the network.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION

The invention describes a method for creating a data structure, also referred to as a primary data structure, for representing one or more nodes in a network, for example a communication network or a transportation network. One or more data fields are created corresponding to each node for storing information relating to the node. One or more references are also created for each node such that each reference refers to one or more nodes adjacent to the corresponding node. The data fields and the references are then stored in one or more secondary data structures, such that the data fields and the references corresponding to one node are stored together in a secondary data structure. Thereafter, each node is associated with at least one secondary data structure which includes the data fields and the references corresponding to the associated node. Thus, the secondary data structure associated with each node includes data relating to the node and information relating to the adjacent nodes in the network. Subsequently, a primary data structure, for example, an array, may be created for storing the secondary data structures.

Figure 1B:
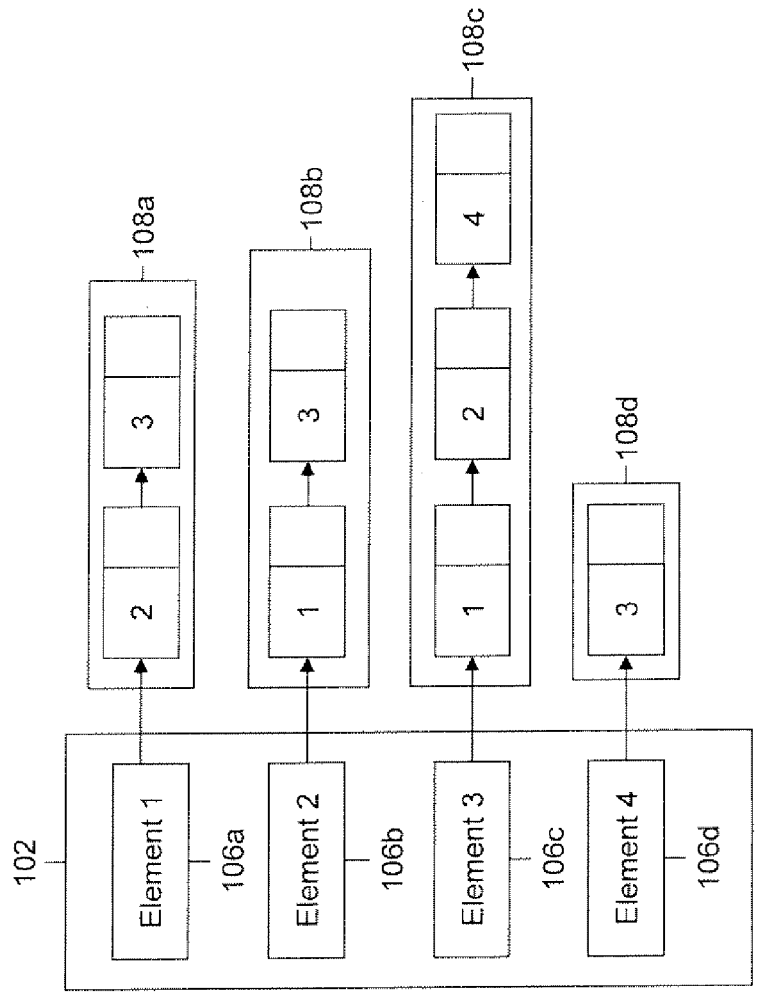
FIG. 1A illustrates an exemplary network and FIG. 1B illustrates a data structure for representing the network, as is known in the art.
Figure 1A:
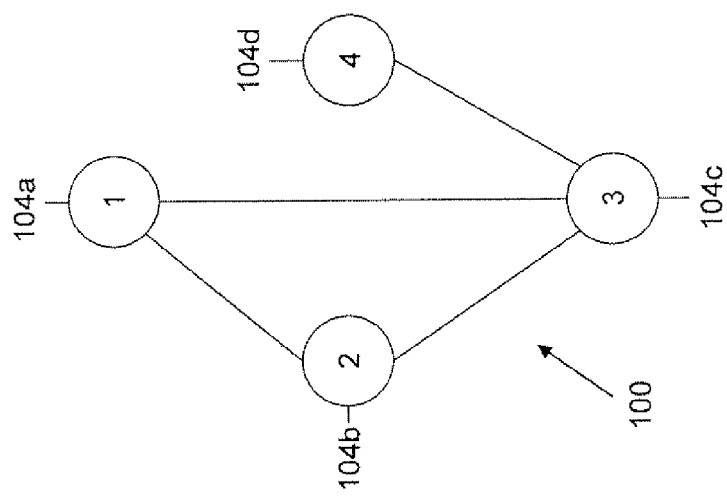

FIG. 1A illustrates an exemplary network such as a network 100 and FIG. 1B illustrates a data structure for representing network 100, as is known in the art. Network 100 includes a plurality of nodes such as nodes 104a, 104b, 104c and 104d, hereinafter referred to as nodes 104. FIG. 1B includes an array 102 which includes a plurality of elements such as element 106a, 106b, 106c, and 106d, hereinafter referred to as elements 106. Elements 106 point to linked lists such as linked lists 108a, 108b, 108c and 108d, hereinafter referred to as linked lists 108.

Network 100 may be represented by array 102 wherein elements 106 may be used to represent nodes 104 in network 100. For example, element 106a represents node 104a, element 106b represents node 104b and so on. Further, elements 106 point to linked lists 108. Linked lists 108 contain adjacency information of nodes 104 that are represented by elements 106. The adjacency information of nodes 104 includes information relating to nodes that are adjacent to nodes 104 in network 100. For example, element 106a may be a pointer pointing to a first element of linked list 108a. Each element of linked list 108a stores an index of array 102 that refers to a node adjacent to node 104a, represented by element 106a. Similarly, element 106b may be a pointer pointing to a first element of linked list 108b. Linked list 108b may include a list of indices of array 102, referring to nodes adjacent to node 104b, represented by element 106b. Thus, linked lists 108 store adjacency information relating to nodes 104.

The adjacency information relating to any two nodes from nodes 104 is stored at two locations using array 102. For example, considering node 104a and node 104b that are adjacent to each other in network 100, linked list 108a stores an index of value '2' that refers to node 104b. Similarly, linked list 108b stores an index of value '1' that refers to node 104a. Therefore, the adjacency information relating to node 104a and node 104b is stored in linked list 108a and linked list 108b. This results in redundancy of information. In addition, updating network 100 involves a significant processing overhead. For example, in case node 104c needs to be deleted from network 100, a reference of node 104c needs to be deleted from linked list 108a, linked list 108b and linked list 108d. In other words, all linked lists from linked lists 108 containing a reference of the node to be deleted, have to be modified while updating network 100. Furthermore, linked lists 108 need to be traversed sequentially in case adjacency information between nodes 104 needs to be determined.

Figure 2:
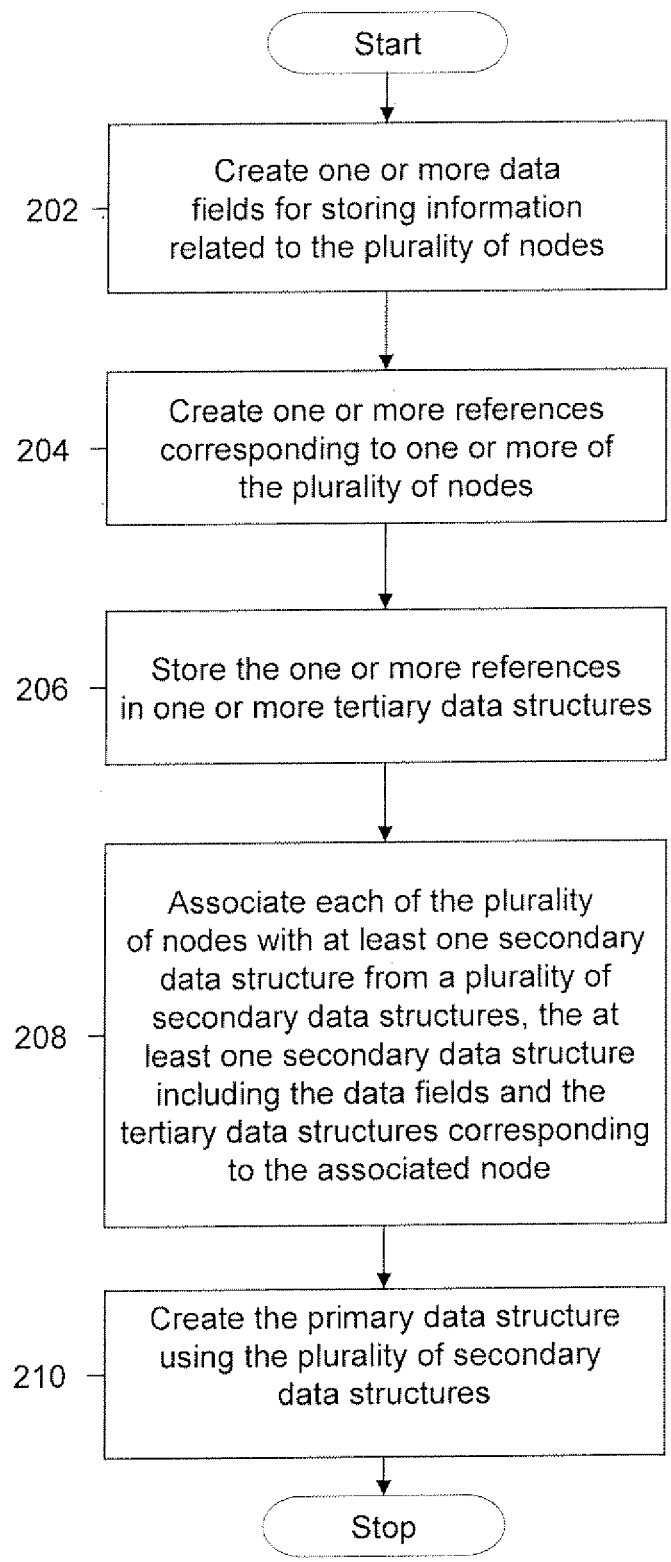
FIG. 2 illustrates a flowchart of a method for creating a primary data structure for representing a plurality of nodes in a network, in accordance with an embodiment of the invention.

FIG. 2 illustrates a flowchart of a method for creating a primary data structure for representing a plurality of nodes in a network such as network 100, in accordance with an embodiment of the invention. At 202, one or more data fields are created for each node to store information relating to the node. For example, in a computer network, one or more data fields may be created for each node to store an Internet Protocol (IP) address corresponding to the node. At 204, one or more references are created, corresponding to one or more nodes. In various embodiments of the invention, each reference corresponding to a node refers to another node adjacent to or associated with the node in the network. Thereafter, at 206, the references may be stored in one or more tertiary data structures, for example, one or more circular linked lists. At 208, each node is associated with at least one secondary data structure from a plurality of secondary data structures. The at least one secondary data structure includes the data fields and the tertiary data structures corresponding to the associated node. In another embodiment of the invention, the tertiary data structures may not be created and the references may be stored directly in the secondary data structures. Subsequently, at 210, the plurality of secondary data structures is stored and the primary data structure is created using the secondary data structures. In an embodiment of the invention, the primary data structure may be an array of pointers pointing to the secondary data structures.

Thus, each node is associated with at least one secondary data structure that includes information relating to the node and information relating to one or more nodes that are adjacent to the node in the network. Therefore, the network may be represented by the primary data structure in which the secondary data structures represent the nodes in the network. Examples of the network may include, but are not limited to, a computer network, a communication network, a traffic network, a road network and a transportation network. In an embodiment of the invention, the primary data structure may be used to represent a molecular structure of a substance, such that the nodes represent the atoms and the connections between the nodes represent the bonds between them. In another embodiment of the invention, the primary data structure may be used in the field of sociology to represent relations between a plurality of variables.

Figure 3:
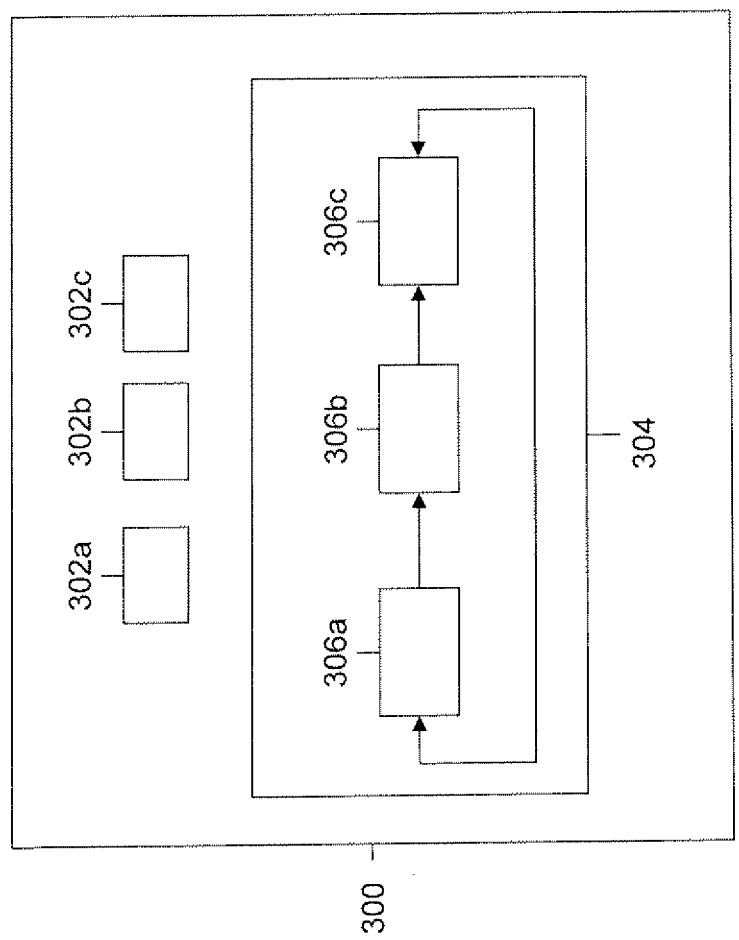
FIG. 3 illustrates an exemplary secondary data structure, in accordance with an embodiment of the invention.

FIG. 3 illustrates an exemplary secondary data structure such as a secondary data structure 300, in accordance with an embodiment of the invention. Secondary data structure 300 includes a plurality of data fields such as data fields 302a, 302b, and 302c, hereinafter referred to as data fields 302; a tertiary data structure 304; and a plurality of references such as references 306a, 306b, and 306c, hereinafter referred to as references 306.

In various embodiments of the invention, each node in a network, such as network 100, is associated with at least one secondary data structure, such as secondary data structure 300. Secondary data structure 300 includes data fields 302 that store information relating to the associated node. For example, in a communication network, data fields 302 may store routing information corresponding to the associated node. Data fields 302 may be one or more of a primitive data type, an array, a list, a graph, a hash or a combination thereof.

References 306 refer to nodes adjacent to the node associated with secondary data structure 300. For example, reference 306a may refer to a node adjacent to the node associated with secondary data structure 300. Similarly, reference 306b may refer to another node adjacent to the node associated with secondary data structure 300. In another embodiment of the invention, references 306 may include one or more null references that do not refer to any node. In yet another embodiment of the invention, references 306 may be pointers pointing to a secondary data structure associated with an adjacent node.

References 306 may be stored in tertiary data structure 304. In an embodiment of the invention, tertiary data structure 304 may be a circular linked list. In another embodiment of the invention, tertiary data structure 304 may be an array. Further, secondary data structure 300 may be stored in a primary data structure, for example, an array or a list. Thus, a plurality of secondary data structures may be used to represent nodes in the network. This is described in detail in conjunction with FIG. 4.

Figure 4:
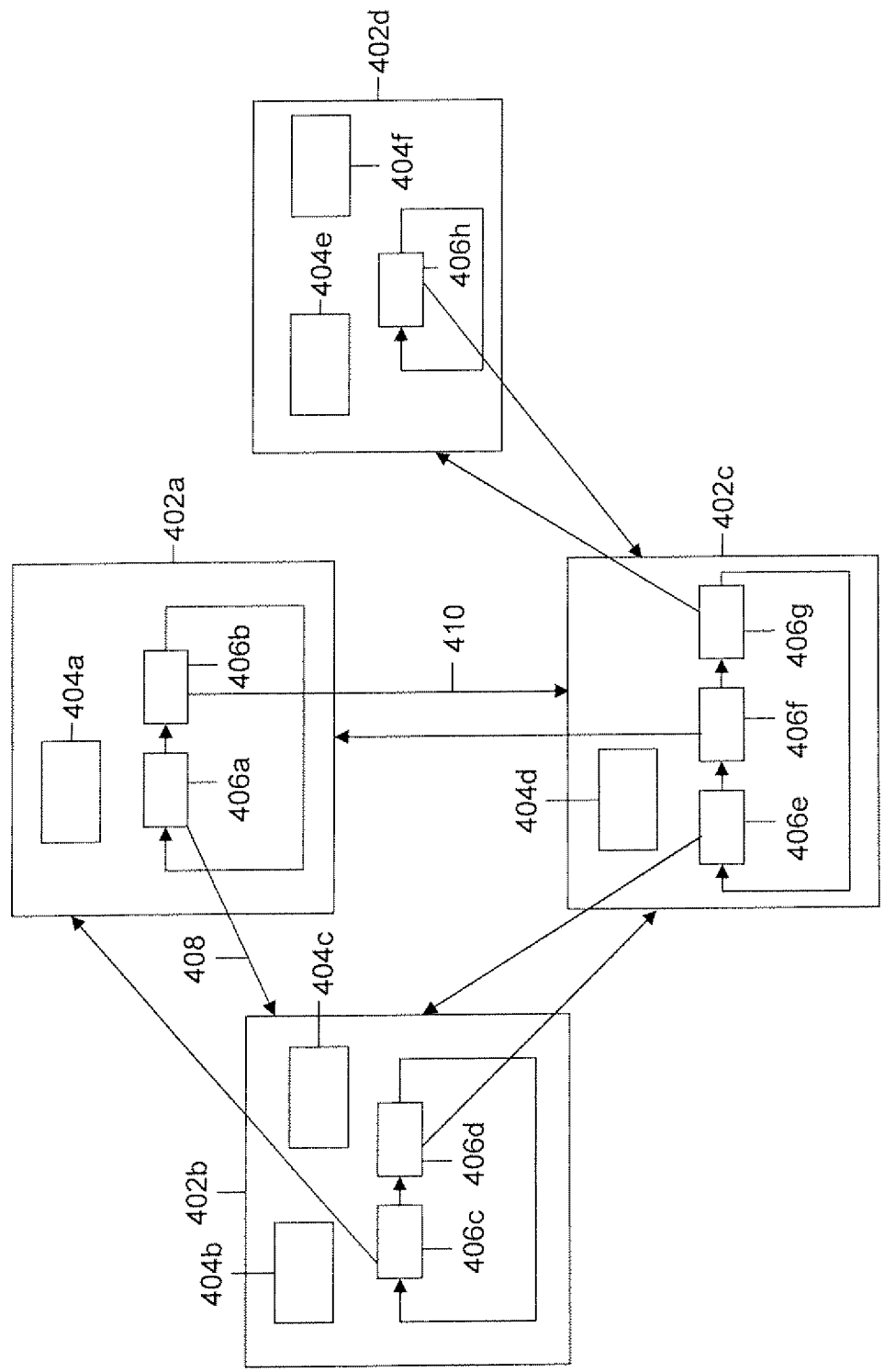
FIG. 4 illustrates a plurality of secondary data structures for representing the plurality of nodes in the exemplary network, in accordance with another embodiment of the invention.

FIG. 4 illustrates a plurality of secondary data structures 402 for representing nodes 104 in network 100, in accordance with another embodiment of the invention.

Secondary data structures 402 include secondary data structures 402a, 402b, 402c and 402d; a plurality of data fields such as data fields 404a, 404b, 404c, 404d, 404e, and 404f, hereinafter referred to as data fields 404; and a plurality of references such as references 406a, 406b, 406c, 406d, 406e, 406f, 406g, and 406h, hereinafter referred to as references 406.

Secondary data structures 402 are associated with nodes 104. In other words, secondary data structures 402 represent nodes 104. For example, secondary data structure 402a may be associated with node 104a. Similarly, secondary data structure 402b may be associated with node 104b and so on. Secondary data structures 402 include one or more data fields from data fields 404 for storing information relating to nodes 104. For example, secondary data structure 402b includes data fields 404b and 404c.

Further, secondary data structures 402 also include one or more references from references 406. In various embodiments of the invention, references 406 refer to a set of nodes adjacent to nodes 104 that are associated with secondary data structures 402. For example, secondary data structure 402a includes references 406a and 406b. References 406a and 406b may be stored in a circular linked list. Reference 406a refers to secondary data structure 402b, as depicted by 408. Since node 104b is associated with secondary data structure 402*b*, reference 406*a* refers to node 104*b* that is adjacent to node 104*a* in network 100. Similarly, reference 406*b* refers to secondary data structure 402*c* as depicted by 410. Since node 104*c* is associated with secondary data structure 402*c*, reference 406*b* refers to node 104*c*, adjacent to node 104*a* in network 100.

Similarly, secondary data structure 402*c* includes references 406*e*, 406*f* and 406*g*. References 406*e*, 406*f* and 406*g* refer to adjacent nodes of node 104*c*, associated with secondary data structure 402*c*. In other words, references 406*e*, 406*f* and 406*g* refer to node 104*b*, 104*a* and 104*d* respectively.

In an embodiment of the invention, references 406 may be pointers pointing to secondary data structures 402. In another embodiment of the invention, references 406 may contain a memory address of secondary data structures 402. In yet another embodiment of the invention, secondary data structures 402 may be stored in an array and references 406 may store their array indices.

In various embodiments of the invention, network 100 may be traversed by accessing references 406. For example, if node 104*d* needs to be accessed from node 104*b*, references 406*c* and 406*d* may be traversed for accessing secondary data structure 402*c*. Thereafter, references 406*e*, 406*f* and 406*g* may be traversed for accessing secondary data structure 402*d* that is associated with node 104*d*.

Thus, secondary data structures 402 may be used to represent nodes 104 of network 100. Since data relating to nodes 104 is stored along with the information relating to adjacent nodes in secondary data structures 402, processing overhead while accessing network 100 is reduced. Furthermore, visualization of network 100 becomes easier since representation of secondary data structures 402 conforms to a real world representation of network 100.

Secondary data structures 402 may also be used to represent a plurality of nodes in a directed network. As is known in the art, a directed network is a network in which the edges i.e. the links between two nodes may be represented as ordered pairs of two nodes. In other words, an edge corresponding to a node may be either outgoing or incoming depending on the direction of the edge with respect to the node. For example, an edge corresponding to a node may be said to be an incoming edge if it is directed towards the node. Similarly, an edge corresponding to a node may be said to be an outgoing edge if it is directed away from the node. In order to represent the directed network, references 406 may refer to a set of nodes that are connected by a set of outgoing edges to the nodes associated with secondary data structures 402. In another embodiment of the invention, references 406 may refer to a set of nodes that are connected by a set of incoming edges to the nodes associated with secondary data structures 402. In still another embodiment of the invention, secondary data structures 402 may include two sets of references. The two sets of references may refer to two sets of nodes connected to the nodes by a set of outgoing edges and a set of incoming edges respectively.

In yet another embodiment of the invention, secondary data structures 402 may represent the edges of a network, such as network 100. Accordingly, references 406 may refer to the nodes corresponding to the edges, such as nodes 104.

Figure 5:
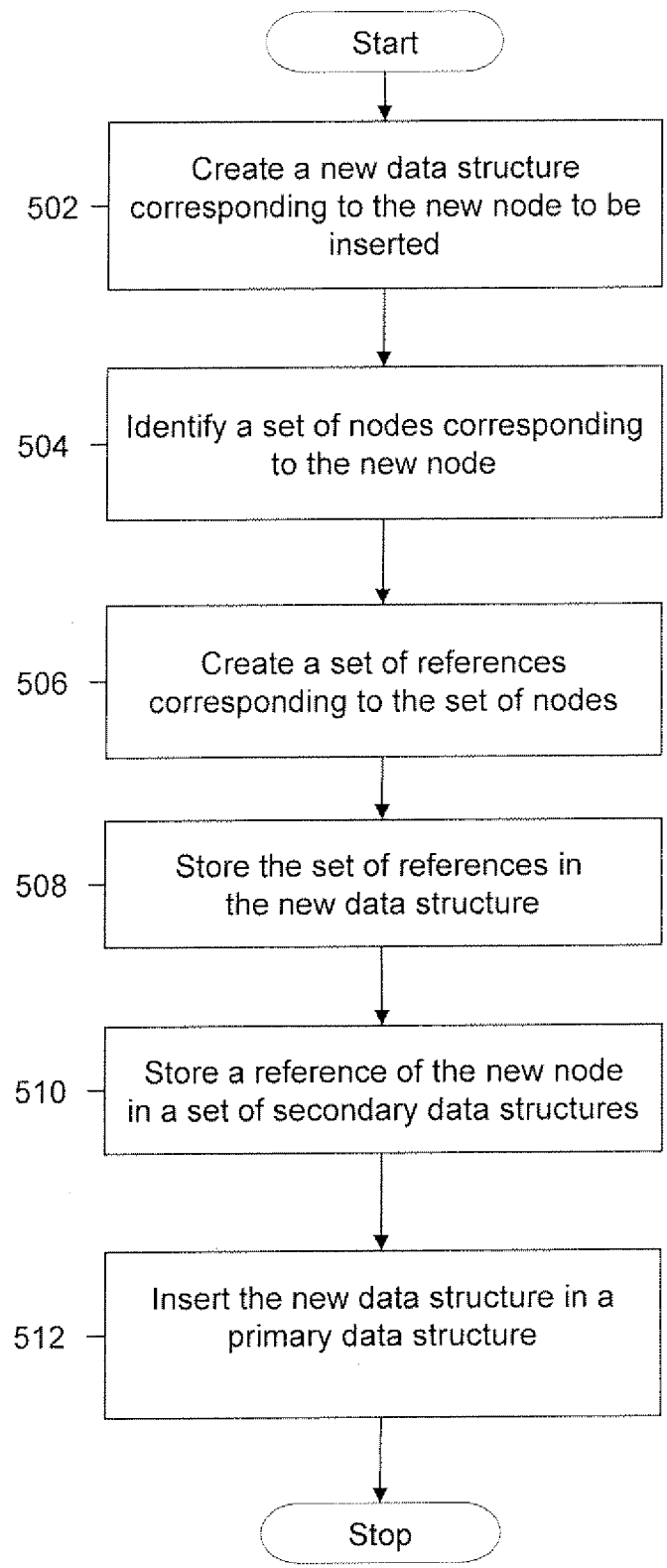
FIG. 5 illustrates a flowchart of a method for inserting a new node in a network, in accordance with another embodiment of the invention.

FIG. 5 illustrates a flowchart of a method for inserting a new node in a network such as network 100, in accordance with another embodiment of the invention.

At 502, a new data structure, including a set of data fields, is created corresponding to the new node to be inserted. The set of data fields may include information relating to the new node. At 504, a set of nodes are identified such that the set of nodes are adjacent to the new node in the network. In an embodiment of the invention, the set of nodes may be identified based on an input received from a user or a predefined criterion defined by the user. In another embodiment of the invention, the set of nodes may include only one node. At 506, a set of references are created corresponding to the set of nodes. Each reference in the set of references refers to a node from the set of nodes. At 508, the set of references are stored in the new data structure. In an embodiment of the invention, the set of references may be stored in a linked list and the linked list may then be stored in the new data structure. Thereafter, at 510, a reference of the new node is stored in a set of existing secondary data structures that are associated with the set of nodes. Subsequently, at 512, the new data structure is stored in a primary data structure such as an array or a list.

In another embodiment of the invention, the new data structure may be a secondary data structure such as secondary data structure 300.

In case a node needs to be deleted from the network, one or more references referring to the node are identified. The references may be identified from a plurality of secondary data structures such as secondary data structures 402. Thereafter, the references may be de-allocated or set to invalid references. Subsequently, the secondary data structure associated with the node may be deleted from the primary data structure. In another embodiment of the invention, the data fields and the references corresponding to the node to be deleted may be identified and de-allocated without deleting the secondary data structure associated with the node.

In an embodiment of the invention, the data structures such as the primary data structure and the secondary data structures may be defined using an object oriented programming language, for example, C++ or Java. Further, the method for creating, accessing and traversing the data structures may also be implemented using the object oriented programming language.

Figure 6:
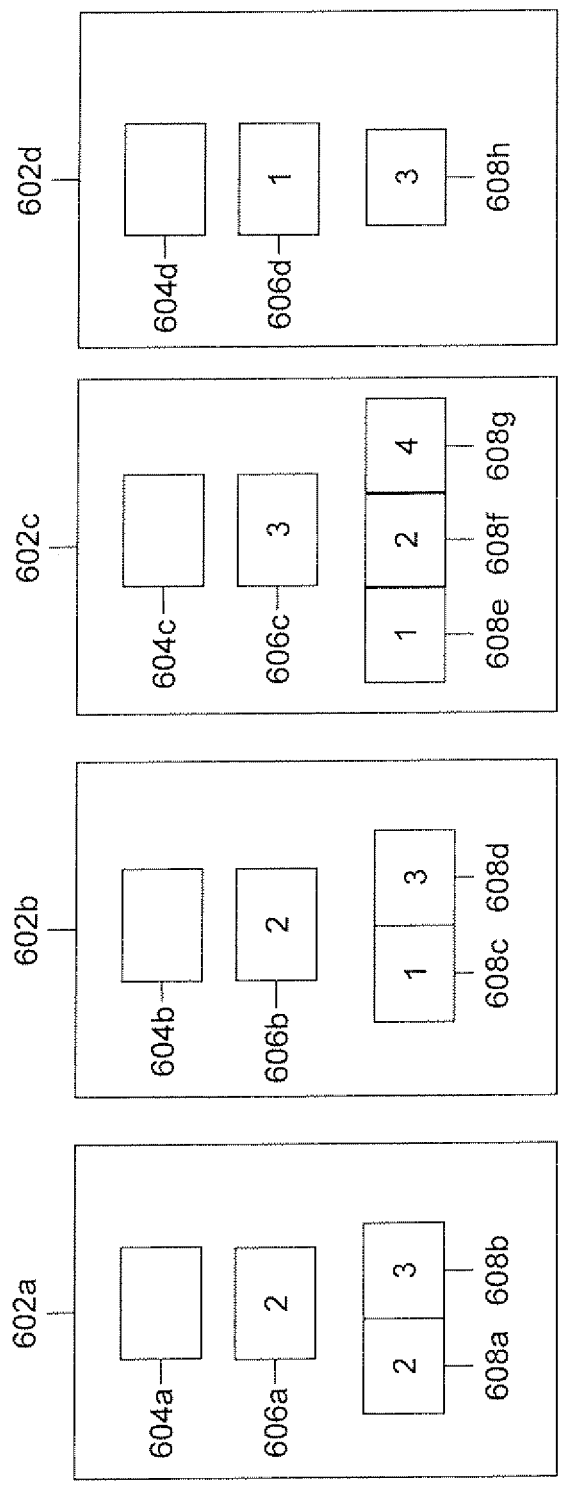
FIG. 6 illustrates a plurality of secondary data structures for representing the plurality of nodes in the exemplary network, in accordance with yet another embodiment of the invention.

FIG. 6 illustrates a plurality of secondary data structures 602 for representing nodes 104 in network 100, in accordance with yet another embodiment of the invention.

Secondary data structures 602 include secondary data structures 602*a*, 602*b*, 602*c* and 602*d*; a plurality of data fields such as data fields 604*a*, 604*b*, 604*c* and 604*d*, hereinafter referred to as data fields 604; a plurality of data elements such as data elements 606*a*, 606*b*, 606*c* and 606*d*, hereinafter referred to as data elements 606; and a plurality of array elements such as array elements 608*a*, 608*b*, 608*c*, 608*d* and so on, hereinafter referred to as array elements 608.

Secondary data structures 602 represent nodes 104 in network 100. For example, secondary data structure 602*a* may be associated with node 104*a*. Similarly, secondary data structure 602*b* may be associated with node 104*b* and so on. Secondary data structures 602 include a data field for storing information relating to nodes 104, associated with secondary data structures 602. Such data fields have been represented as data fields 604 in FIG. 6. For example, secondary data structure 602*a* may include a data field 604*a* for storing information relating to node 104*a*. In another embodiment of the invention, secondary data structures 602 may include more than one data field.

Secondary data structures 602 also include data elements 606. Data elements 606 are used to store information relating to the number of array elements that are stored in corresponding secondary data structures 602. For example, two array elements such as array elements 608*a* and 608*b* are stored in secondary data structure 602*a*. Accordingly, data element 606*a* stored in secondary data structure 602*a* stores information relating to the number of array elements, i.e., value '2'.

Similarly, three array elements such as array elements 608*e*, 608*f*, and 608*g* are stored in secondary data structure 602*c*. Accordingly, data element 606*c* stored in secondary data structure 602*c* stores information relating to the number of array elements, i.e., value '3'.

Secondary data structures 602 may be stored in a primary data structure such as an array. Array elements 608 store indices of secondary data structures 602, when stored in the array. Further, array elements 608 refer to nodes 104 that are associated with secondary data structures 602, stored at the corresponding indices. For example, secondary data structure 602*a* includes array elements 608*a* and 608*b*. Array element 608*a* stores an index of value '2' that refers to secondary data structure 602*b*, stored at index '2' in the array. Thus, array element 608*a* refers to node 104*b* associated with secondary data structure 602*b* and adjacent to node 104*a*. Similarly, array element 608*b* stores an index of value '3' that refers to secondary data structure 602*c* which in turn is associated with node 104*c*, adjacent to node 104*a*.

In case a connection between two nodes from nodes 104 needs to be determined, array elements 608 need to be traversed. Since an array allows random access of elements, array elements 608 may be accessed randomly to access nodes adjacent to nodes 104. Therefore, secondary data structures 602 need not be traversed sequentially to access network 100.

Figure 7:
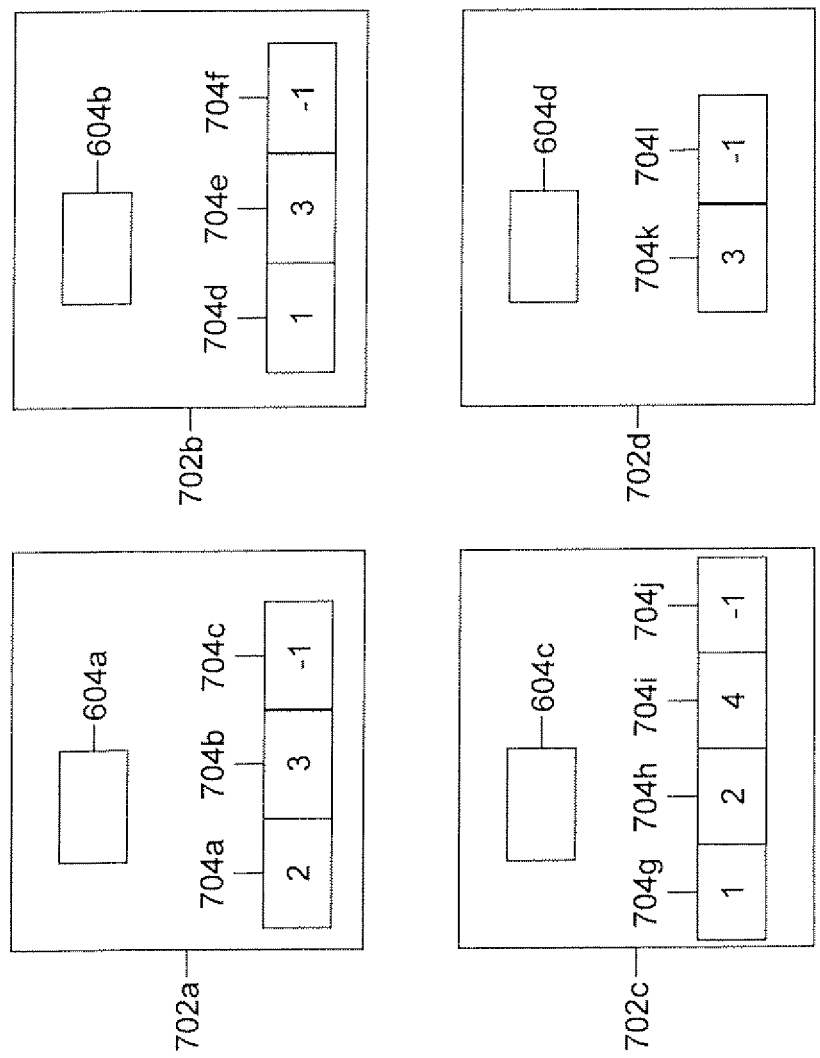
FIG. 7 illustrates a plurality of secondary data structures for representing the plurality of nodes in the exemplary network, in accordance with still another embodiment of the invention.

FIG. 7 illustrates a plurality of secondary data structures 702 for representing nodes 104 in network 100, in accordance with still another embodiment of the invention.

Secondary data structures 702 include secondary data structures 702*a*, 702*b*, 702*c* and 702*d*; data fields 604; and a plurality of array elements such as array elements 704*a*, 704*b*, 704*c*, 704*d* and so on, hereinafter referred to as array elements 704.

Nodes 104 are associated with secondary data structures 702. Secondary data structures 702 may be stored in an array. Array elements 704 store indices of secondary data structures 702, when stored in the array. Array elements 704 may store an invalid index to indicate the number of adjacent nodes corresponding to nodes 104. For example, node 104*a* has two adjacent nodes in network 100, i.e. nodes 104*b* and 104*c*. Array elements 704*a* and 704*b* store indices of secondary data structures 702*b* and 702*c* thereby referring to nodes 104*b* and 104*c*. Array element 704*c* may store an invalid index of value '−1' to indicate that node 104*a*, associated with secondary data structure 702*a*, has two adjacent nodes in network 100. Similarly, array element 704*j* may store an index of value '−1' to indicate that node 104*c*, associated with secondary data structure 702*c*, has three adjacent nodes in network 100.

Therefore, data elements such as data elements 606 need not be stored to indicate the number of nodes adjacent to nodes 104 thereby reducing redundancy of data in a data structure.

In an embodiment of the invention, information relating to nodes adjacent to nodes 104 may be stored only once. For example, information relating to adjacent nodes 104*a* and 104*b* may be stored in only one secondary data structure from secondary data structures 702*a* and 702*b*. Thus, redundancy of data may be further reduced.

The method and computer program product for creating a primary data structure for representing a plurality of nodes in a network have a number of advantages. Since information relating to adjacent nodes in the network need not be stored individually for each node, redundancy of data in a data structure is reduced. This also results in reduction of processing overhead since adjacency information may be stored and updated for only one node from a pair of adjacent nodes. This also minimizes the risk of data inconsistency as adjacency information need not be stored corresponding to all the nodes. In addition, the primary data structure enables random access of adjacent nodes in the network thus reducing the processing time. Furthermore, visualization of the network becomes easier, since the data structures conform to a real world representation of the network.

The method for creating a data structure for representing a plurality of nodes in a network, as described in the present invention, may be embodied in the form usable through a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN), and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for creating a data structure for representing a plurality of nodes in a network. The computer program product includes a computer usable medium having a set program instructions comprising a program code for creating a data structure for representing a plurality of nodes in a network. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

The invention claimed is:

1. A method for creating a primary data structure for representing a plurality of nodes in a network, the method comprising:
   a. creating one or more data fields for storing information related to the plurality of nodes, each of the one or more data fields being created corresponding to a node from the plurality of nodes;
   b. creating one or more references corresponding to one or more of the plurality of nodes, each of the one or more references referring to a node adjacent to the corresponding one or more nodes;
   c. associating each of the plurality of nodes with at least one secondary data structure from a plurality of secondary data structures, the at least one secondary data structure comprising the one or more data fields and two sets of references, each set of references comprising one or more references corresponding to two sets of nodes connected to the nodes by a set of outgoing edges and a set of incoming edges; and
   d. storing the plurality of secondary data structures, wherein the primary data structure is created using the stored plurality of secondary data structures, wherein the references corresponding to each of the one or more nodes are stored in one or more tertiary data structures, the one or more tertiary data structures being stored in one or more secondary data structures corresponding to the one or more nodes; and each of the one or more tertiary data structures is a circular linked list.

2. The method according to claim 1, wherein each of the one or more references refer to a secondary data structure from the plurality of secondary data structures, the secondary data structure being associated with the node adjacent to the corresponding one or more nodes.

3. The method according to claim 1, wherein the one or more data fields is at least one of a primitive data type, an array, a list, a tree, a graph or a combination thereof.

4. The method according to claim 1 further comprising traversing the primary data structure by accessing the one or more references corresponding to the one or more nodes.

5. The method according to claim 1 further comprising inserting a new node in the network, wherein inserting the new node comprises:
   a. creating a new data structure corresponding to the new node to be inserted, the new data structure comprising a set of data fields for storing information related to the new node;
   b. setting one or more references in the new data structure to one or more invalid addresses; and
   c. inserting the new data structure in the primary data structure.

6. The method according to claim 5 further comprising:
   a. identifying a set of nodes adjacent to the new node to be inserted;
   b. creating a set of references corresponding to the set of nodes; and
   c. storing the set of references in the new data structure.

7. The method according to claim 6 further comprising storing a reference of the new node in a set of secondary data structures.

8. The method according to claim 1 further comprising deleting at least one node from the network, wherein deleting the at least one node comprises:
   a. identifying one or more references referring to the at least one node, the one or more references being identified from the plurality of secondary data structures;
   b. de-allocating the one or more references; and
   c. deleting one or more secondary data structures corresponding to the at least one node from the plurality of secondary data structures.

9. A computer program product for use with a computer, the computer program product comprising a non-transitory computer usable device having a computer readable program code embodied therein for creating a primary data structure for representing a plurality of nodes in a network, the computer readable program code performing:
   a. creating one or more data fields for storing information related to the plurality of nodes, each of the one or more data fields being created corresponding to a node from the plurality of nodes;
   b. creating one or more references corresponding to one or more of the plurality of nodes, each of the one or more references referring to a node adjacent to the corresponding one or more nodes;
   c. associating each of the plurality of nodes with at least one secondary data structure from a plurality of secondary data structures, the at least one secondary data structure comprising the one or more data fields and two sets of references, each set of references comprising one or more references corresponding to two sets of nodes connected to the nodes by a set of outgoing edges and a set of incoming edges; and
   d. storing the plurality of secondary data structures, wherein the primary data structure is created using the stored plurality of secondary data structures, wherein the references corresponding to each of the one or more nodes are stored in one or more tertiary data structures, the one or more tertiary data structures being stored in one or more secondary data structures corresponding to the one or more nodes; and each of the one or more tertiary data structures is a circular linked list.

10. The computer program product according to claim 9, wherein each of the one or more references refer to a secondary data structure from the plurality of secondary data structures, the secondary data structure being associated with the node adjacent to the corresponding one or more nodes.

11. The computer program product according to claim 9, wherein the one or more data fields is at least one of a primitive data type, an array, a list, a tree, a graph or a combination thereof.

12. The computer program product according to claim 9, wherein the computer readable program code further performs traversing the primary data structure by accessing the one or more references corresponding to the one or more nodes.

13. The computer program product according to claim 9, wherein the computer readable program code further performs inserting a new node in the network, wherein inserting the new node comprises:
   a. creating a new data structure corresponding to the new node to be inserted, the new data structure comprising a set of data fields for storing information related to the new node;
   b. setting one or more references in the new data structure to one or more invalid addresses; and
   c. inserting the new data structure in the primary data structure.

14. The computer program product according to claim 13, wherein the computer readable program code further performs:

a. identifying a set of nodes adjacent to the new node to be inserted;
b. creating a set of references corresponding to the set of nodes; and
c. storing the set of references in the new data structure.

15. The computer program product according to claim 14, wherein the computer readable program code further performs storing a reference of the new node in a set of secondary data structures.

16. The computer program product according to claim 9, wherein the computer readable program code further performs deleting at least one node from the network, wherein deleting the at least one node comprises:
a. identifying one or more references referring to the at least one node, the one or more references being identified from the plurality of secondary data structures;
b. de-allocating the one or more references; and
c. deleting one or more secondary data structures corresponding to the at least one node from the plurality of secondary data structures.

\* \* \* \* \*